Oct. 24, 1933.   V. J. CHAPMAN   1,932,263
ARC WELDING
Original Filed Oct. 1, 1931

Inventor:
Verni J. Chapman,
by Charles E. Tullar
His Attorney.

Patented Oct. 24, 1933

1,932,263

UNITED STATES PATENT OFFICE 1,932,263

ARC WELDING

Verni J. Chapman, Schenectady, N. Y., assignor to General Electric Company, a corporation of New York Application October 1, 1931, Serial No. 566,293
Renewed March 18, 1933

6 Claims. (Cl. 219—8)

My invention relates to arc welding, and more particularly to an electrode feeding device for automatically feeding short length electrodes.

It is difficult to feed from a coil of indefinite length heavy electrode material such as is required for certain welding operations. Short lengths of electrode material may, however, be readily fed, but its use is subject to the objection that the welding operation must be discontinued periodically for the insertion of a new electrode.

It is an object of my invention to supply in succession to the feeding means of an arc welding machine short lengths of electrode material which are automatically welded into a continuous rod before being supplied to the feeding means.

Figure 1:
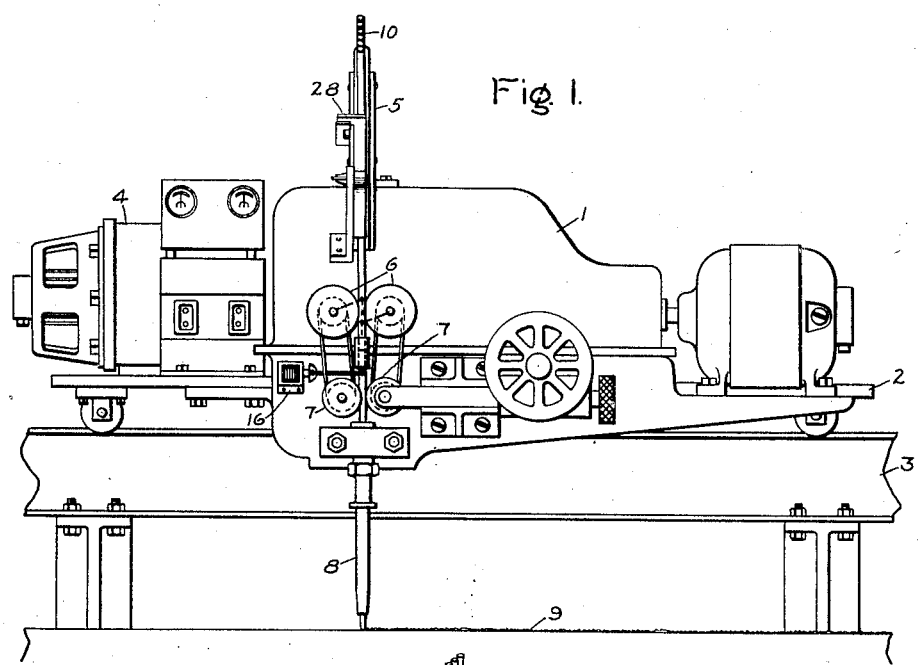
Figure 2:
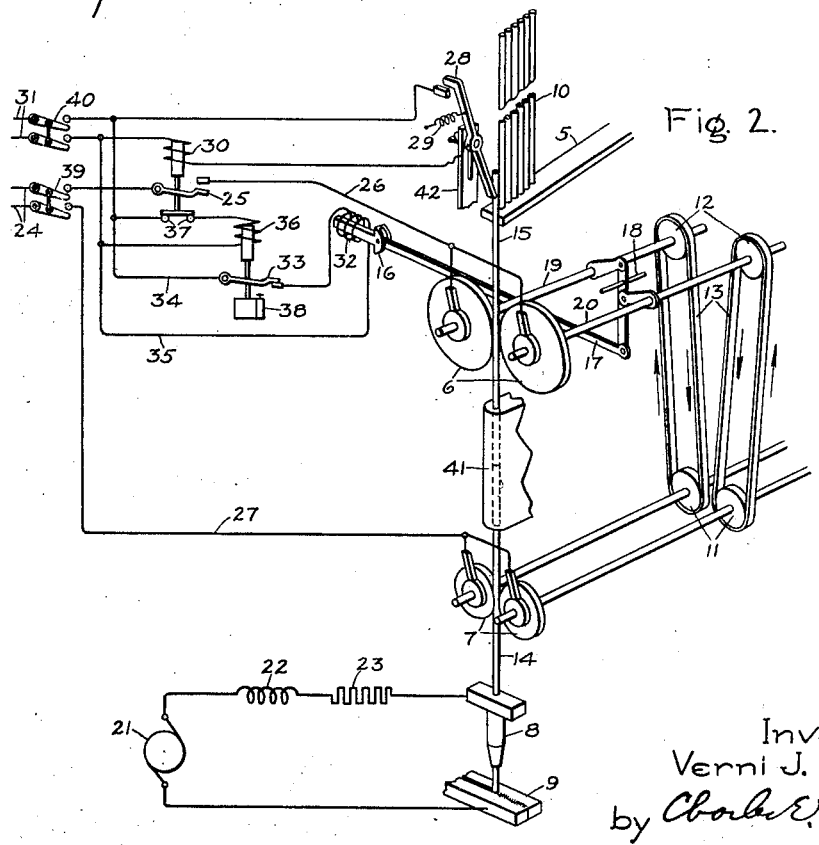

One embodiment of my invention is illustrated in the accompanying drawing in which Fig. 1 is a front view of welding apparatus according to my invention, and Fig. 2 is a diagrammatic illustration of the arrangement of parts and control employed in this embodiment for welding short length electrodes into a continuous length of electrode material.

In Fig. 1 the welding head 1 is mounted on a carriage 2 which is traversed along a track 3 by a motor 4. Electrode material in stick form is fed from a magazine 5 by feed rolls 6 and 7 through a nozzle 8 toward the work 9 which is supported or clamped in place with its seam extending in the direction of the track 3. The arrangement of parts and control employed is diagrammatically illustrated in Fig. 2.

As shown in Fig. 2 stick electrodes 10 are fed from the magazine 5 by feed rolls 6 to feed rolls 7 by means of which they are fed through the nozzle 8 to the work 9 in accordance with their consumption in the welding arc. It will be noted that feed rolls 6 are of larger diameter than feed rolls 7. Feed rolls 6 are however rotated at substantially the same rate of speed as feed rolls 7 by means of a suitable transmission such as pulleys 11 and 12 and belts 13. Feed rolls 7 are held in firm driving engagement with the electrode material 14 inserted between them, and depending upon the rate and direction of rotation of these feed rolls, the electrode material is fed to and from the work 9 by suitable means for striking and maintaining the welding arc. Feed rolls 6 are held in slipping engagement with the electrode material 15 therebetween. Such an arrangement is necessary due to the larger size of these rolls and their rate of rotation. The mechanism comprising feed rolls 6 and 7 constitute in effect a feeding means by means of which a plurality of articles are fed in firm end to end engagement. The feed rolls 7 determine the speed at which the articles are fed and the feed rolls 6 which make a driving engagement with the articles tend to feed them in excess of the speed determined by the feed rolls 7. Means are provided, however, for periodically causing feed rolls 6 firmly to engage the electrode material between them. This means includes an electromagnet 16 connected by a rod 17 to a toggle mechanism 18 by means of which the distance between the shafts 19 and 20 of feed rolls 6 is controlled.

Arc welding current is supplied to the nozzle 8 and the work 9 from a suitable source 21 connected thereto through the usual stabilizing reactance 22 and/or resistance 23. This source may be a constant potential source, the current from which is suitably modified by the stabilizing resistance 23, or it may be a generator whose voltage varies in accordance with the current demand such as illustrated in U. S. Letters Patent No. 1,340,004, Bergman, for Dynamo electric machines, granted May 11, 1920, and assigned to the same assignee as the present case.

Current for welding together electrodes 14 and 15 by a resistance welding operation is supplied from a source 24 through a switch 25 and conductors 26 and 27 to feed rolls 6 and 7. The operation of switch 25 is controlled by a switch 28 which connects its operating coil 30 to an auxiliary source of supply 31 when permitted to close upon the withdrawal of an electrode from the magazine 5. In the particular arrangements illustrated switch 28 is biased to its closed position by a spring 29. The operation of electromagnet 16 is controlled through the energization of its coil 32 which is connected across the auxiliary source of supply 31 through a switch 33 and conductors 34 and 35. Switch 33 is controlled by a coil 36 which is connected across the auxiliary source of supply 31 through contacts 37 when switch 25 is in its open position. The closing of switch 33 upon being deenergized is delayed through the action of a time-delay device such as the dash pot 38 illustrated in the drawing. The switches in the control circuits illustrated in the drawing have been shown in the positions they occupy when their circuits are deenergized through the opening of switches 39 and 40.

The method of operation is as follows: Switches 39 and 40 are closed. Upon the closure of switch 40, switch 33 is opened through energization of its coil 36 which is connected across the auxiliary source of supply 31 through contacts 37 and switch 40. Feed rolls 6 are consequently held in slipping engagement with electrode 15 and lightly forced into engagement with electrode 14 held between feed rolls 7. As soon as the upper end of electrode 15 has passed the lower end of its operating lever, switch 28 is permitted to close through the agency of its spring 29 to energize the operating coil 30 of switch 25. Upon the closure of switch 25 welding current is supplied across the abutting end-portions of the electrodes 14 and 15 located within the guide 41 from source 24 through switch 29, switch 25 and conductors 26 and 27. At the same time the energization of coil 36 of switch 33 is interrupted and after a predetermined interval determined by the setting of the dash-pot 38 switch 33 closes to the position illustrated in the drawing thereby energizing coil 32 of electromagnet 16 through a circuit including switch 40, conductors 34 and 35, and switch 33. Upon the energization of electromagnet 16 feed rolls 6 are forced into firm engagement with the electrode 15 and complete the butt-welding operation of the electrodes 14 and 15 by applying positive end pressure to electrode 15.

As soon as electrode 15 has been withdrawn from the magazine another electrode is fed by gravity or other means from this magazine to the feed rolls 6. This opens the switch 28 thereby deenergizing coil 30 of switch 25 and interrupting the flow of welding current to the electrodes 14 and 15 which are thereafter fed through the welding arc as a continuous rod. The operation just described is automatically repeated upon the withdrawal of another electrode from the magazine 5.

The operation of switch 28 upon the withdrawal of an electrode from magazine 5 depends upon its location relative thereto. Preferably the position of switch 28 relative to the magazine is made adjustable. Such an arrangement is shown in the drawing. The supporting bracket 42 for switch 28 is slotted, and switch 28 is held in the slot by means of a clamp screw in such manner that its position relative to an electrode being withdrawn from the magazine may be determined. Preferably the adjustment is such that the end of the operating lever of switch 28 slips over the end of the electrode being withdrawn from the magazine before said electrode has been fully withdrawn from the magazine. Switch 28 thus closes before the electrode is fully withdrawn from the magazine and the end of the electrode in the magazine serves to prevent the other electrodes in the magazine from opening switch 28 until said electrode has been fully withdrawn from the magazine.

It is to be understood that certain features of my invention are not limited to electrode feeding devices and modifications and variations are contemplated as fall within the scope of my invention which is set forth in the appended claims.

What I claim as new and desire to secure by Letters Patent of the United States, is,—

1. Arc welding apparatus comprising electrode feeding means, a magazine for supplying in succession short length electrodes to said feeding means, and means for withdrawing electrodes from said magazine and butt welding them to electrodes being fed by said feeding means.

2. Arc welding apparatus comprising means for feeding in succession a plurality of short length electrodes, a magazine for supplying said electrodes and means controlled by the withdrawal of an electrode from said magazine for welding said electrode to the electrode immediately preceding it.

3. Arc welding apparatus comprising electrode feeding means, a magazine for supplying in succession short length electrodes to said feeding means, means for withdrawing electrodes from said magazine and holding them in abutting engagement with the electrode being fed by said feeding means, means controlled by the withdrawal of an electrode from said magazine for applying a welding current across the abutting end portions of said electrodes and thereafter applying a longitudinal welding pressure to the electrode withdrawn from said magazine to weld it to the electrode being fed by said feeding means.

4. Arc welding apparatus comprising electrode feeding means, a magazine for supplying in succession short length electrodes to said feeding means, means for withdrawing electrodes from said magazine and holding them in abutting engagement with the immediately preceding electrodes and means for butt welding the electrode withdrawn from said magazine to said preceding electrode before said preceding electrode has passed through said feed means.

5. Arc welding apparatus comprising feed rolls, a magazine for supplying in succession short length electrodes, additional feed rolls of larger diameter than said first-mentioned feed rolls interposed between said first-mentioned feed rolls and said magazine, means for rotating all of said feed rolls at substantially the same speed to feed electrodes from said magazine, and means for periodically supplying welding current through said feed rolls to the electrodes held by them and forcefully engaging said feed rolls of larger diameter with the electrode being fed by them to butt weld said short length electrodes together into a continuous rod for said first-mentioned feed rolls.

6. Apparatus comprising feed rolls of different diameters spaced from one another in the direction of feed, means for rotating said rolls at substantially the same speed in a direction to feed articles from the rolls of larger diameter to the rolls of smaller diameter, means for holding said rolls of smaller diameter in firm engagement with the articles fed thereby, and means for holding said rolls of larger diameter in slipping engagement with the articles fed thereby.

VERNI J. CHAPMAN.